United States Patent
Andersen et al.

(10) Patent No.: US 10,557,307 B2
(45) Date of Patent: Feb. 11, 2020

(54) DRILLING TOOL

(71) Applicant: WELLTEC A/S, Allerød (DK)

(72) Inventors: Tomas Sune Andersen, Helsingør (DK); Sven Karsten Jensen, Stenløse (DK)

(73) Assignee: Welltec A/S, Allerød (DK)

(*) Notice: Subject to any disclaimer, the term of this patent is extended or adjusted under 35 U.S.C. 154(b) by 111 days.

(21) Appl. No.: 14/916,693

(22) PCT Filed: Sep. 9, 2014

(86) PCT No.: PCT/EP2014/069141
§ 371 (c)(1),
(2) Date: Mar. 4, 2016

(87) PCT Pub. No.: WO2015/036383
PCT Pub. Date: Mar. 19, 2015

(65) Prior Publication Data
US 2016/0215564 A1 Jul. 28, 2016

(30) Foreign Application Priority Data
Sep. 10, 2013 (EP) .................................. 13183708

(51) Int. Cl.
E21B 4/04 (2006.01)
E21B 7/00 (2006.01)
(Continued)

(52) U.S. Cl.
CPC ............... *E21B 4/04* (2013.01); *B23B 45/02* (2013.01); *E21B 7/00* (2013.01); *E21B 21/00* (2013.01);
(Continued)

(58) Field of Classification Search
CPC ..... E21B 4/04; E21B 7/00; E21B 21/00; E21B 41/00
See application file for complete search history.

(56) References Cited

U.S. PATENT DOCUMENTS 2,643,087 A * 6/1953 Ogorzaly .................. E21B 4/04
166/165
2,743,084 A 4/1956 Arutunoff
(Continued)

FOREIGN PATENT DOCUMENTS

| CN | 102962496 A | 3/2013 |
| CN | 103015890 A | 4/2013 |

(Continued)

OTHER PUBLICATIONS

Notification of the First Office Action dated Jul. 27, 2017 in Chinese Application No. 201480047077.2, with English Translation (10 pages).
(Continued)

Primary Examiner — Cathleen R Hutchins
Assistant Examiner — Jonathan Malikasim
(74) Attorney, Agent, or Firm — Nixon & Vanderhye P.C.

(57) ABSTRACT

Drilling tool (1) for drilling openings in a cement ballast tank (3) of an oil rig in order to gain access to an internal space in the ballast tank comprising an electrical motor (6) driving a first shaft (7); a pump (8) driven by the motor for pumping well fluid in through an inlet (9) and out through an outlet (10); a gear (11) driven by the first shaft extending through the pump for reducing rotation of a second shaft (12); and a drilling head (14) having bits and at least one drilling head fluid channel and being driven by the second shaft (12), the outlet of the pump being fluidly connected with the fluid channel to pump well fluid out through the fluid channel.

20 Claims, 8 Drawing Sheets

(51) Int. Cl.
  *E21B 21/00* (2006.01)
  *E21B 41/00* (2006.01)
  *B23B 45/02* (2006.01)
  *E21B 23/00* (2006.01)

(52) U.S. Cl.
  CPC .......... *E21B 41/00* (2013.01); *B23B 2226/75* (2013.01); *B23B 2270/62* (2013.01); *E21B 2023/008* (2013.01)

(56) References Cited

U.S. PATENT DOCUMENTS

| | | | | |
|---|---|---|---|---|
| 3,553,969 | A * | 1/1971 | Chamberlin | B63B 35/4406 405/210 |
| 3,664,438 | A * | 5/1972 | Winget | B63C 11/52 175/405.1 |
| 4,031,969 | A | 6/1977 | Cullen et al. | |
| 5,000,272 | A | 3/1991 | Wiebe et al. | |
| 6,063,001 | A * | 5/2000 | Suhling | E21B 43/121 417/410.3 |
| 6,305,469 | B1 | 10/2001 | Coenen et al. | |
| 9,174,281 | B2 | 11/2015 | Schenk | |
| 2011/0129375 | A1* | 6/2011 | Kotsonis | E21B 4/02 418/4 |
| 2014/0326510 | A1* | 11/2014 | Wessel | E21B 34/14 175/61 |

FOREIGN PATENT DOCUMENTS

| | | |
|---|---|---|
| GB | 2 496 907 | 5/2013 |
| GB | 2496907 A | 5/2013 |
| RU | 2 191 243 C2 | 12/2000 |
| RU | 84 045 U1 | 6/2009 |
| SU | 1472613 A1 | 4/1989 |
| WO | WO 00/75476 | 12/2000 |
| WO | WO 2004/011766 | 2/2004 |

OTHER PUBLICATIONS

International Search Report for PCT/EP2014/069141 dated Jan. 7, 2015, four pages.
Written Opinion of the ISA for PCT/EP2014/069141 dated Jan. 7, 2015, five pages.
Notification Concerning Transmittal of International Preliminary Report on Patentability (Chapter I of the Patent Cooperation Treaty) dated Mar. 24, 2016 issued in International Application No. PCT/EP2014/069141 (7 pages).
Federal Service for Intellectual Property (Rospatent), Decision on Patent Grant for Invention dated May 29, 2018 in Russian Application No. 2016110751/03(016975), with English translation (16 pages).
Examination Report dated Oct. 17, 2019 in Indian Application No. 201647010291, 6 pages.

* cited by examiner

DRILLING TOOL

This application is the U.S. national phase of International Application No. PCT/EP2014/069141 filed 9 Sep. 2014 which designated the U.S. and claims priority to EP Patent Application No. 13183708.0 filed 10 Sep. 2013, the entire contents of each of which are hereby incorporated by reference.

FIELD OF THE INVENTION

The present invention relates to a drilling tool for drilling openings in a cement ballast tank of an oil rig in order to gain access to an internal space in the ballast tank. Also, the present invention relates to a downhole system.

BACKGROUND ART

Some oil rigs are mounted on ballast tanks, and when such oil rigs are abandoned, the content of theses tanks needs to be examined before they can be sealed off. Due to the jack up structure or similar structure of the oil rig, it can be very difficult to gain access to the top of the ballast tank as the space may be very limited.

SUMMARY OF THE INVENTION

It is an object of the present invention to wholly or partly overcome the above disadvantages and drawbacks of the prior art. More specifically, it is an object to provide a downhole tool capable of providing access to ballast tanks from the top of the tanks.

The above objects, together with numerous other objects, advantages and features, which will become evident from the below description, are accomplished by a solution in accordance with the present invention by a drilling tool for drilling openings in a cement ballast tank of an oil rig in order to gain access to an internal space in the ballast tank, the drilling tool comprising:
  an electrical motor driving a first shaft,
    a pump driven by the motor for pumping well fluid in through an inlet and out through an outlet,
    a gear driven by the first shaft extending through the pump for reducing rotation of a second shaft, and
    a drilling head having bits and at least one drilling head fluid channel and being driven by the second shaft, the outlet of the pump being fluidly connected with the fluid channel to pump well fluid out through the fluid channel,
wherein the gear is arranged in a gear housing arranged in a tool housing defining a gear fluid channel providing fluid communication between the pump and the drilling head fluid channel to prevent well fluid from entering the gear.

The drilling tool may further comprise a compensator in fluid communication with the gear housing for pressurising the gear housing with a compensator fluid.

Furthermore, the drilling tool may comprise a control section electrically connected with a wireline, the compensator being arranged between the control section and the motor.

In an embodiment, the compensator may be arranged between the gear housing and the pump.

Furthermore, the first shaft may be hollow and the compensator may be fluidly connected with the gear housing through the hollow first shaft.

Moreover, the hollow first shaft may extend through the pump and drives the pump.

In addition, the gear may be a planetary gear.

In one embodiment, the planetary gear may have a plurality of stages.

In another embodiment, the planetary gear may be a multistage planetary gear.

The gear housing may further comprise a bearing.

Additionally, the drilling bit may be a hole saw bit.

The drilling tool may further comprise a coupling section arranged between the gear and the drilling head.

Furthermore, the coupling section may be connected with the second shaft and may comprise a bearing for taking up an axial load.

In an embodiment, the coupling section may further comprise a release element, such as a shear pin, for releasing the drilling head.

The drilling tool may further comprise a guide means for guiding the drilling head.

Also, the guide means may project from the tool housing.

Moreover, the drilling tool may comprise a driving unit, such as a downhole tractor, for propelling the tool forward in a well.

The present invention furthermore relates to a downhole system comprising:
  a drilling tool as described above, and
  a ballast tank partly made partly of cement and iron.

BRIEF DESCRIPTION OF THE DRAWINGS

The invention and its many advantages will be described in more detail below with reference to the accompanying schematic drawings, which for the purpose of illustration show some non-limiting embodiments and in which.

All the figures are highly schematic and not necessarily to scale, and they show only those parts which are necessary in order to elucidate the invention, other parts being omitted or merely suggested.

DETAILED DESCRIPTION OF THE INVENTION

Figure 1:
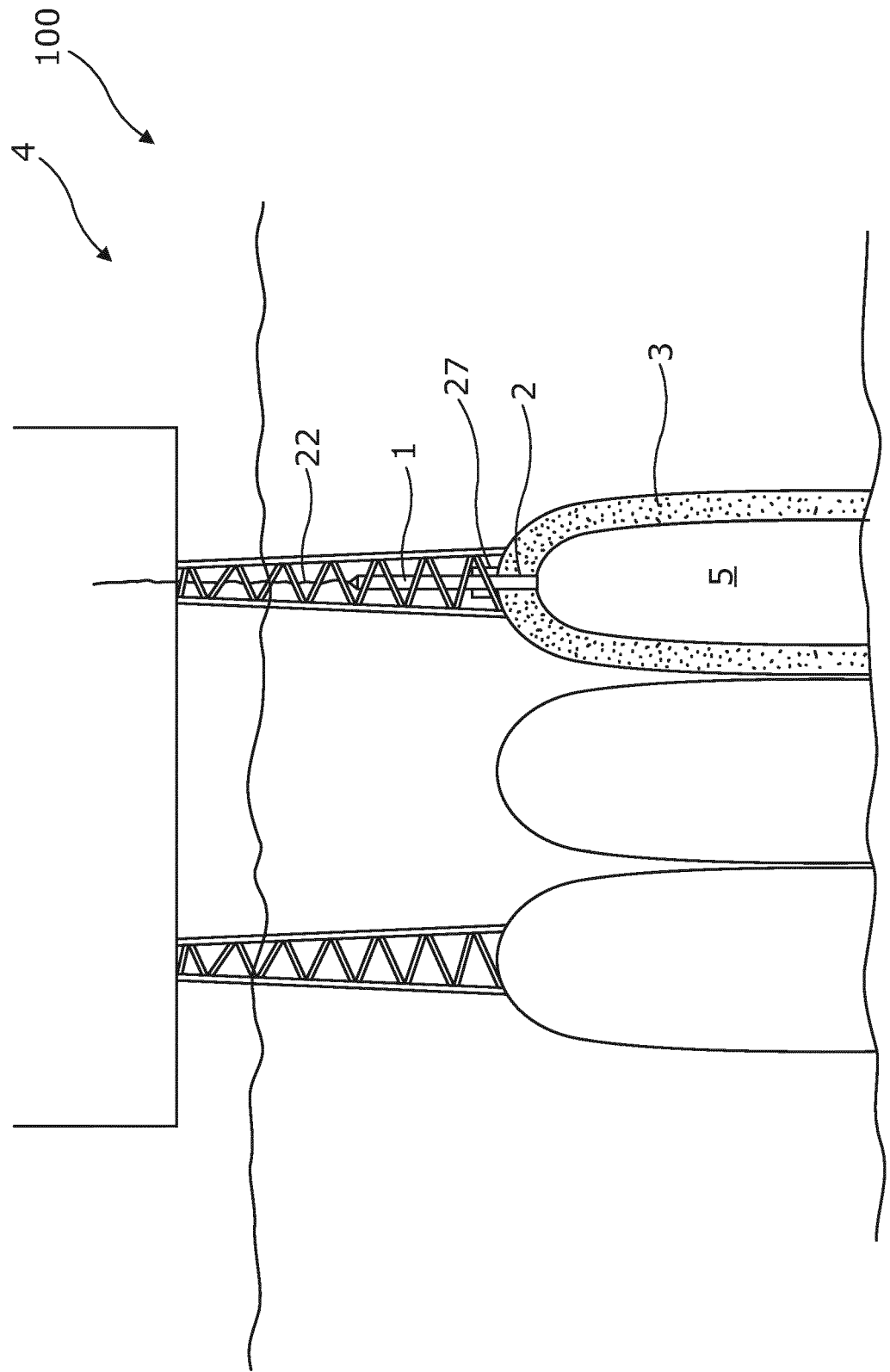
FIG. 1 shows a downhole system having a drilling tool for drilling into a ballast tank (seen in cross-section) of an oil rig.

FIG. 1 shows a downhole drilling tool 1 drilling an opening 2 in a cement ballast tank 3 on which an oil rig 4 is supported. The drilling tool drills 1 a longitudinal opening in order to gain access to an internal space 5 in the ballast tank 3. When such tanks are abandoned, the content of the tanks needs to be investigated to ensure that the tanks do not contain any substances which may have an environmental impact. Ballast tanks 3 are made of cement and reinforcement iron and are hollow.

Figure 2:
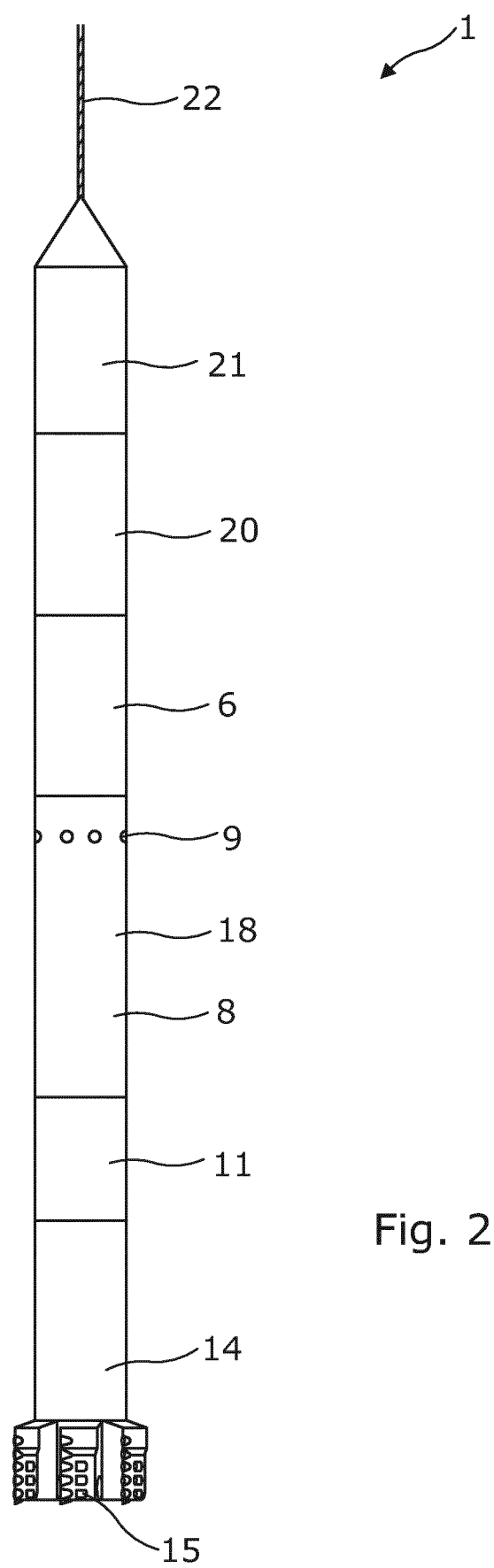
FIG. 2 shows a downhole drilling tool.

The drilling tool 1 of FIG. 2 comprises a drilling head 14 having bits 15 for drilling into the ballast tank 3. The drilling tool 1 further comprises an electrical motor 6 powered by a wireline 22 through a control section 21 and driving a pump 8 for pumping well fluid in through an inlet 9 and out through the drilling head 14. A gear 11 is arranged between the drilling head 14 and the pump 8 and is driven by the motor 6 via a first shaft 7 (shown in FIGS. 5 and 6) extending through the pump for reducing rotation of a second shaft 12 including shaft sections 12.1, 12.2, 12.3 (shown in FIGS. 4A, 6, and 7) driving the drilling head. The drilling tool further comprises a compensator 20 for pressurising the gear 11 to prevent dirty well fluid from entering the gear.

Figure 3:
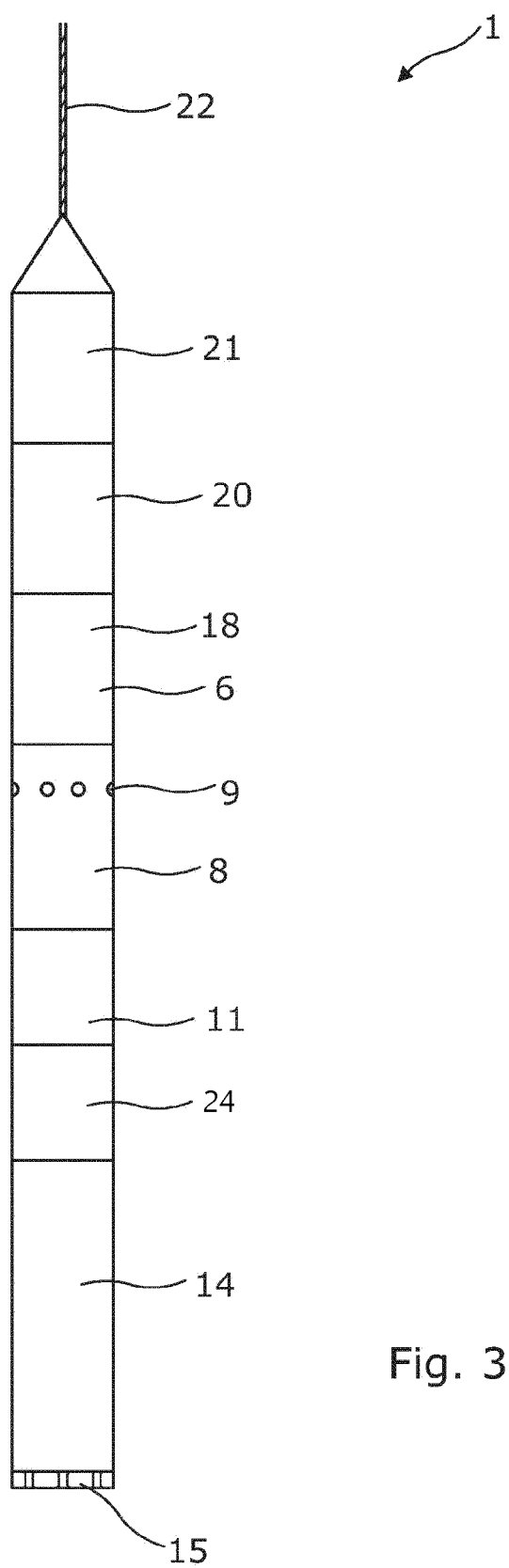
FIG. 3 shows another downhole drilling tool.

In FIG. 3, the drilling head 14 is a hole saw bit and is connected with the second shaft 12 (shown in FIG. 4A) by means of a coupling section 24 (shown in FIG. 4A) comprising a bearing 44 (shown in FIG. 7) for taking up an axial load. The coupling section 24 further comprises a release element 26 (shown in FIG. 7), such as a shear pin, for releasing the drilling head 14 from the rest of the tool 1 in the event that the drilling head gets stuck during a drilling operation.

Figure 4:
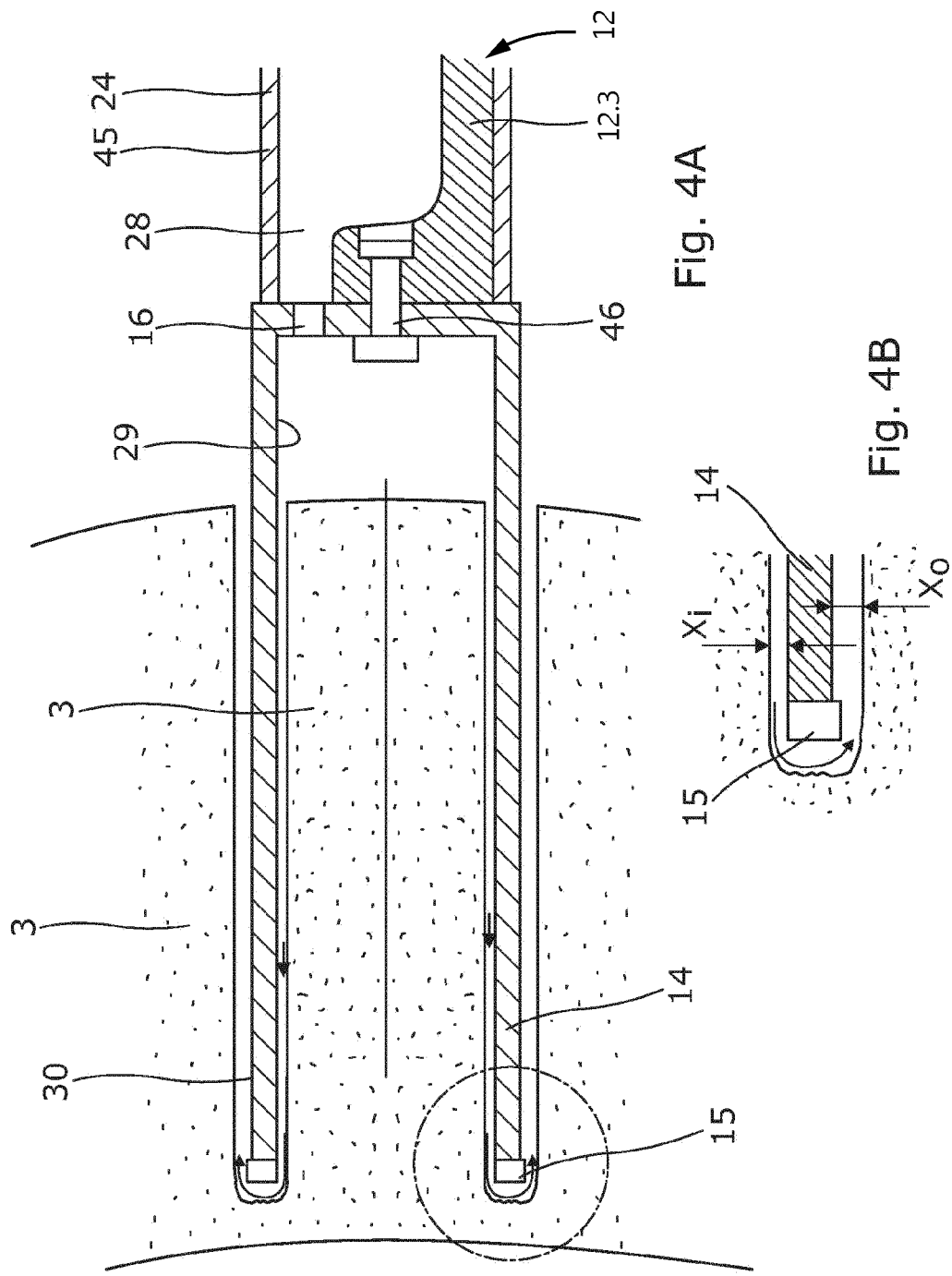
FIG. 4A shows a cross-sectional view of a drilling head of the drilling tool.
FIG. 4B shows an enlarged view of part of the drilling head.

FIG. 4A shows a cross-sectional view of the drilling head 14 in the form of a hole saw bit during a drilling operation in a ballast tank 3. The drilling head 14 is connected with section 12.3 of the second shaft 12 and has several drilling head fluid channels 16 facing fluid channels 28 in the coupling section 24. As indicated by arrows, the well fluid pumped in through inlets 9 in the pump passes the drilling head fluid channels 16 and is forced to flow along an inner face 29 of the hole saw bit until the well fluid reaches the bit 15, flows around the bit and then flows back to the pump inlet 9 along an outer face 30 of the hole saw bit.

As seen in FIG. 4B, an outer distance $X_o$ between the outer face 30 of the hole saw bit and the cement material of the ballast tank 3 is larger than an inner distance $X_i$ between the inner face 29 of the hole saw bit and the cement of the ballast tank 3. By pumping well fluid out through the drilling head fluid channels 16, the well fluid is forced along the bit 15 to cool the same during the drilling operation, and since the inner distance is smaller than the outer distance, fragments in the well fluid do not get stuck. If the well fluid was sucked in through the drilling head, fragments capable of passing along the outer face could still get stuck when trying to pass the inner face of the hole saw bit. By forcing the fluid to flow along the smallest distance first, such fragments will not get stuck.

Figure 5:
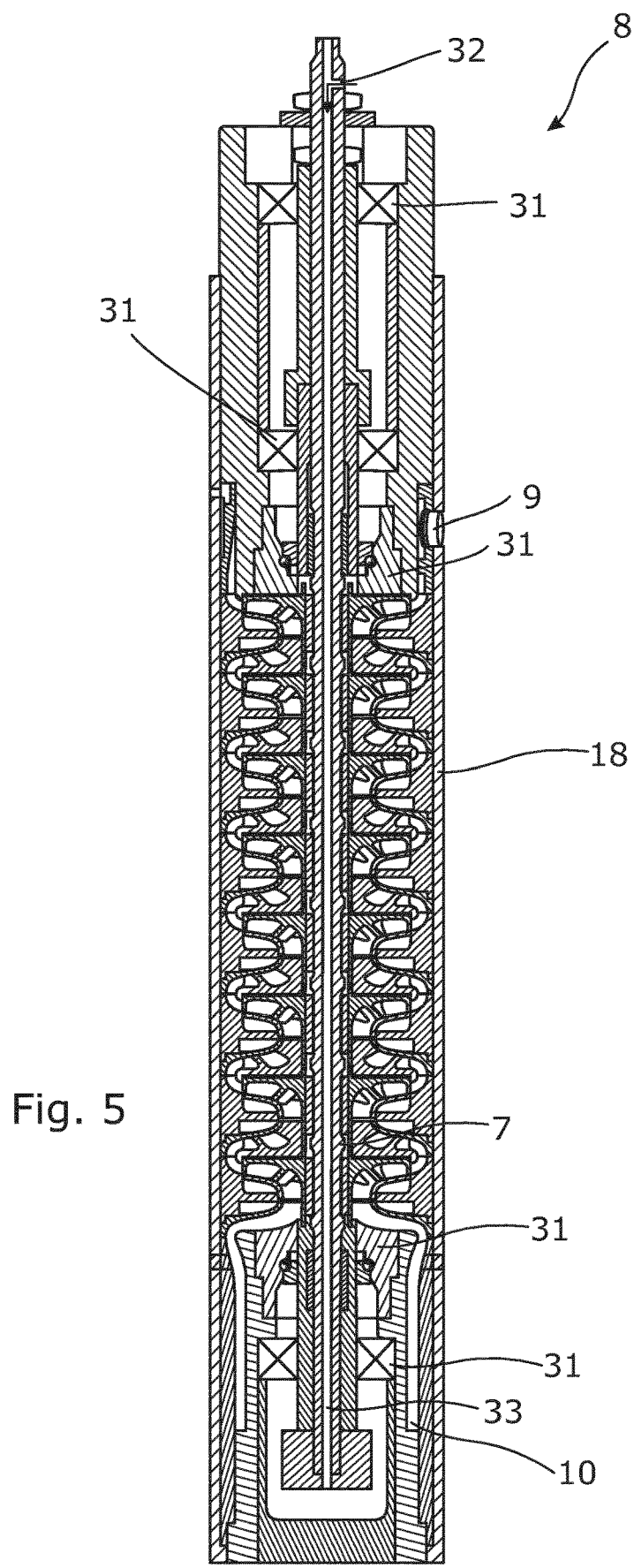
FIG. 5 shows a pump of the drilling tool.

The pump 8 shown in FIG. 5 is driven by the motor for pumping well fluid in through an inlet 9 and out through an outlet 10. The pump 8 has a tool housing 18, and the first shaft 7 extends through the pump. The pump 8 is a centrifugal pump, and the pump stages are driven by rotation of the first shaft 7. The first shaft 7 is hollow to provide compensator fluid to the gear 11 (shown in FIG. 2), and the well fluid flows on the outside of the first shaft 7 and is pumped into the drilling head fluid channel 16 (shown in FIG. 4A) through the gear. The compensator fluid enters the hollow first shaft 7 at the shaft inlet 32 and leaves the shaft through the shaft outlet 33 and flows further into the gear. The first shaft 7 is supported by pump bearings 31 for taking up axial and radial loads.

Figure 6:
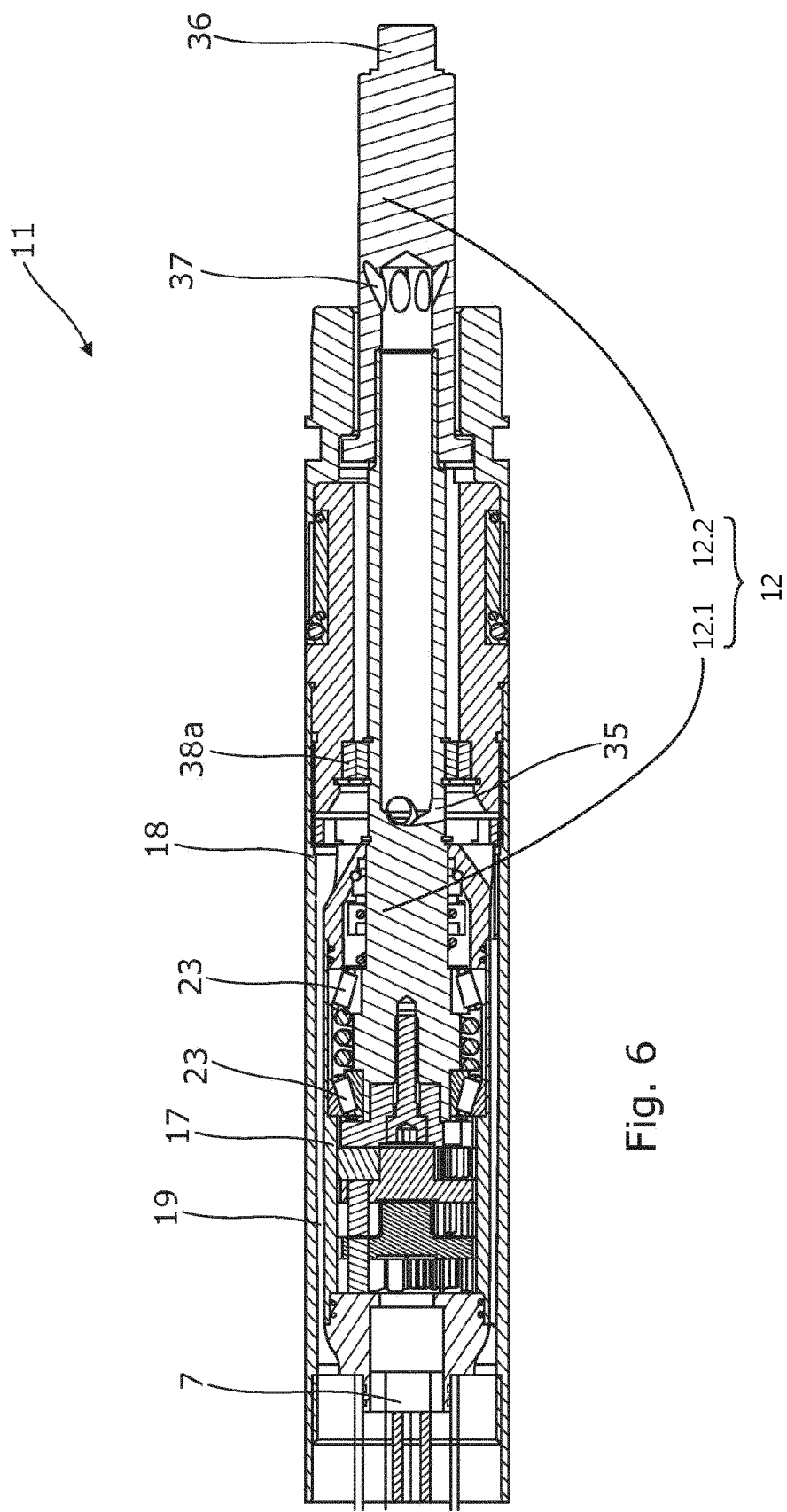
FIG. 6 shows a gear of the drilling tool.
Figure 7:
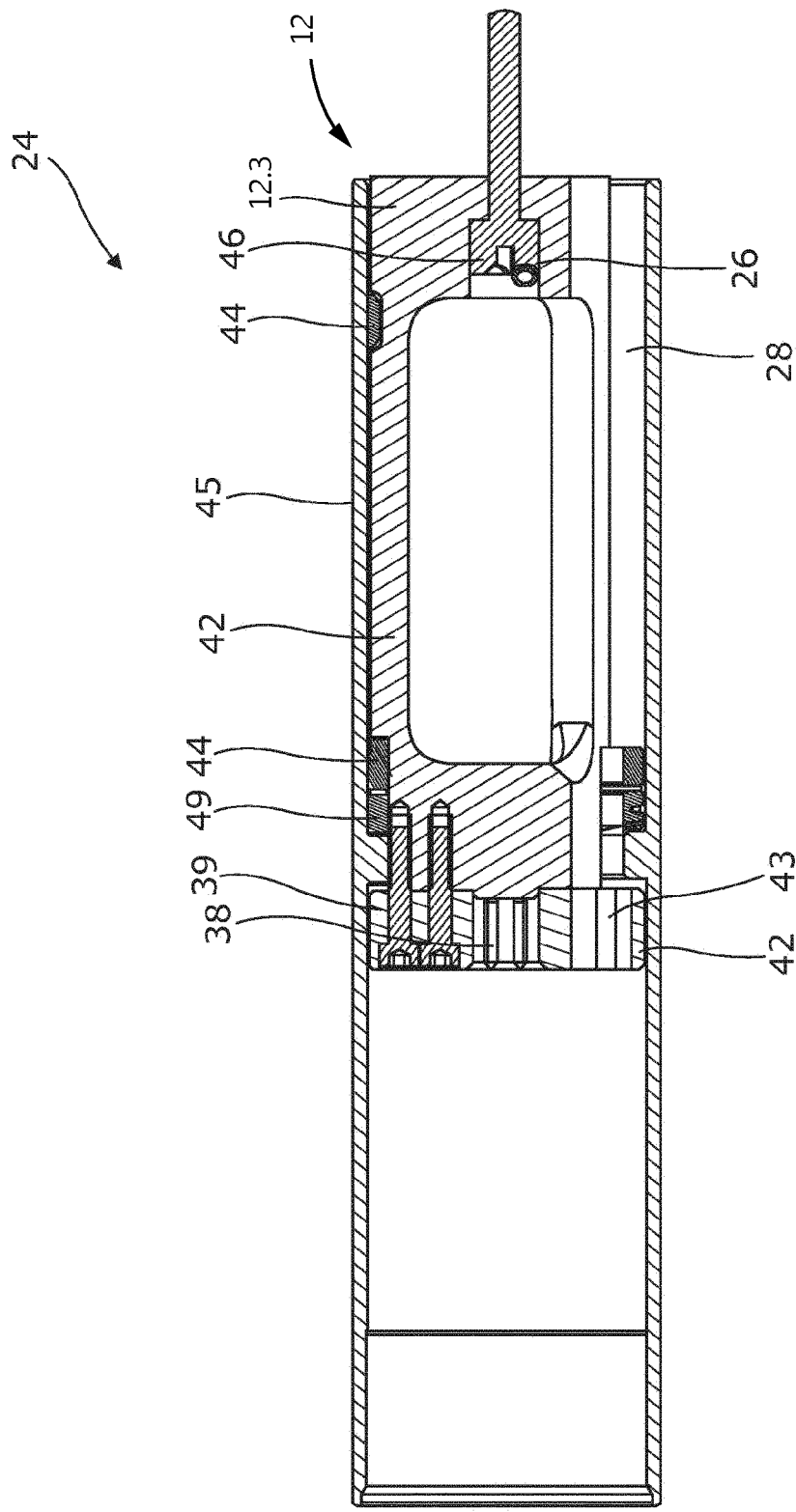
FIG. 7 shows a coupling section of the drilling tool.

In FIG. 6, the gear 11 is driven by the first shaft 7 to reduce rotation of a second 30 shaft 12 driving the drilling head 14 (shown in FIG. 2) at a reduced rotational velocity. A second shaft end 36 of section 12.2 of the second shaft 12 is connected with the drilling head 14 through the coupling section 24, as shown in FIG. 7. The gear 11 is arranged in a gear housing 17 which is arranged in the tool housing 18. The gear housing 17 and the tool housing 18 define a gear fluid channel 19 providing 35 fluid communication between the pump 8 and the drilling head fluid channel 16 (shown in FIG. 4A). Thus, the compensator 20 is in fluid communication with the gear housing 17 to pressurise the gear housing with compensator fluid so that well fluid is prevented from entering the gear housing. The well fluid flows on the outside of the gear housing 17, and the compensator fluid flows inside the gear housing to provide an overpressure in the gear housing. The gear 11 is a reduction gear, such as a multistage planetary gear having at least two stages. The gear housing 17 further comprises a bearing 23, such as an angled roller bearing, for controlling section 12.1 of the second shaft 12 and taking up both axial and radial loads. The bearing 23 is arranged downstream of the planetary gear in the gear housing 17 ending in a cone-shaped part sealingly connected with section 12.1 of the second shaft 12. The well fluid flows on the outside of the gear housing 17 and is guided by the cone-shaped part into second shaft inlets 35 and further into a hollow part of section 12.1 of the second shaft 12. The well fluid enters the coupling through second shaft outlets 37 and flows further into the drilling head fluid channels 16. Section 12.1 of the second shaft 12 is supported by a shaft bearing 38$a$, such as a journal bearing, arranged outside the gear housing 17.

The second shaft end 36 of the gear 11 (shown in FIG. 6) engages with a coupling part 42 of section 12.3 of the second shaft 12 by engaging a bore 38 in a shaft part 39, shown in FIG. 7. The release elements 26 connect the shaft part 39 with the coupling part 42 of section 12.3 of the second shaft 12, and if the bit gets stuck, the release elements shear and the remaining part of the tool 1 is detached from the drilling head. Well fluid flows from the second shaft outlets 37 (shown in FIG. 6) into an opening 43 in the shaft part 39 and out of the coupling section into the drilling head fluid channel 16 (shown in FIG. 4A). The coupling part 42 of section 12.3 of the second shaft 12 has a hollow shape to allow as much well fluid as possible to enter even though section 12.3 of the shaft part 12 rotates. Coupling bearings 44 are arranged between section 12.3 of the second shaft 12 and a coupling housing 45. Section 12.3 of the second shaft 12 is connected with the drilling head through a bolt 46.

As can be seen in FIG. 1, a downhole system 100 comprises a drilling tool 1 and a ballast tank 3 partly made of cement and reinforced iron. The drilling tool 1 may further comprise a guide means 27 for guiding the drilling head 14 when being arranged on top of the ballast tank.

By fluid or well fluid is meant any kind of fluid that may be present in oil or gas wells downhole, such as natural gas, oil, oil mud, crude oil, water, etc. By gas is meant any kind of gas composition present in a well, completion, or open hole, and by oil is meant any kind of oil composition, such as crude oil, an oil-containing fluid, etc. Gas, oil, and water fluids may thus all comprise other elements or substances than gas, oil, and/or water, respectively.

By a casing is meant any kind of pipe, tubing, tubular, liner, string etc. used downhole in relation to oil or natural gas production.

Figure 8:
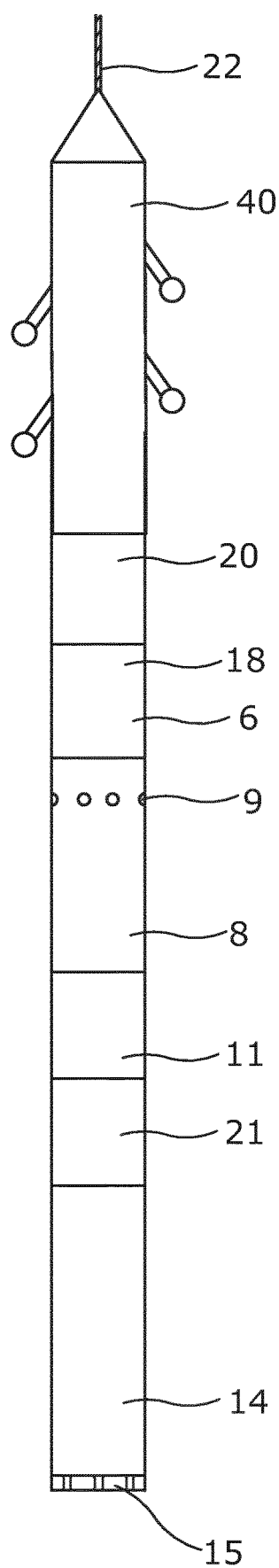
FIG. 8 shows yet another drilling tool.

In the event that the tool is not submergible all the way into the casing as shown in FIG. 8, a driving unit 40 such as a downhole tractor can be used to push the tool all the way into position in the well. The downhole tractor may have projectable arms having wheels, wherein the wheels contact the inner surface of the casing for propelling the tractor and the tool forward in the casing. A downhole tractor is any kind of driving tool capable of pushing or pulling tools in a well downhole, such as a Well Tractor®.

Although the invention has been described in the above in connection with preferred embodiments of the invention, it will be evident for a person skilled in the art that several modifications are conceivable without departing from the invention as defined by the following claims.

The invention claimed is:

1. A drilling tool for drilling openings in a cement ballast tank of an oil rig in order to gain access to an internal space in the ballast tank, the drilling tool comprising:
   an electrical motor driving a first shaft,
   a pump driven by the motor for pumping well fluid in through an inlet and out through an outlet,
   a gear, driven by the first shaft extending through the pump, for reducing rotation of a second shaft, and
   a drilling head having bits and at least one drilling head fluid channel and being driven by the second shaft, the outlet of the pump being fluidly connected with the fluid channel to pump well fluid out through the fluid channel,
   wherein the gear is arranged in a gear housing, the gear housing arranged in a tool housing, the gear housing and the tool housing defining a gear fluid channel providing fluid communication between the pump and the drilling head fluid channel to prevent well fluid from entering the gear, and
   wherein the drilling tool further comprises a compensator in fluid communication with the gear housing for pressurising the gear housing with a compensator fluid, and wherein, in use, a gear housing pressure in the gear housing is controlled so as to be greater than a tool housing pressure thus ensuring the well fluid does not contact the gear, and
   wherein the first shaft is hollow to define a compensator fluid passage for the compensator fluid, and the second shaft is hollow and has a well fluid passage for the well fluid, the compensator fluid being different than the well fluid, and wherein the well fluid passage and the compensator fluid passage are isolated from one another.

2. The drilling tool according to claim 1, further comprising a control section electrically connected with a wireline, the compensator being arranged between the control section and the motor.

3. The drilling tool according to claim 1, wherein the compensator is fluidly connected with the gear housing through the hollow first shaft.

4. The drilling tool according to claim 1, wherein the gear is a planetary gear.

5. The drilling tool according to claim 1, wherein the gear housing further comprises a bearing.

6. The drilling tool according to claim 1, wherein the drilling bit is a hole saw bit.

7. The drilling tool according to claim 6, further comprising a coupling section arranged between the gear and the drilling head.

8. The drilling tool according to claim 7, wherein the coupling section is connected with the second shaft and comprises a bearing configured to take up an axial load.

9. The drilling tool according to claim 7, wherein the coupling section further comprises a release element configured to release the drilling head.

10. The drilling tool according to claim 1, further comprising a guide configured to guide the drilling head.

11. The drilling tool according to claim 10, wherein the guide is configured to project from the tool housing.

12. The drilling tool according to claim 1, further comprising a driving unit configured to propel the tool forward in a well.

13. A downhole system comprising:
    the drilling tool according to claim 1, and
    a ballast tank partly made partly of cement and iron.

14. The drilling tool according to claim 1, wherein the gear fluid channel is configured to permit well fluid to flow between the gear housing and the tool housing.

15. The drilling tool according to claim 1, wherein the pump is configured to pump well fluid radially outward of the gear housing.

16. The drilling tool according to claim 1, wherein a portion of an outer surface of the gear housing is spaced from an inner surface of the tool housing, the gear fluid channel formed in the portion between the outer surface of the gear housing and the inner surface of the tool housing.

17. The drilling tool according to claim 1, further comprising a hole in a side wall of the tool housing through which the well fluid enters the inlet of the pump.

18. The drilling tool according to claim 1, wherein the pump is configured to transport both the well fluid and the compensator fluid.

19. The drilling tool according to claim 1, wherein the gear fluid channel has an annular shape.

20. A drilling tool for drilling openings in a cement ballast tank of an oil rig in order to gain access to an internal space in the ballast tank, the drilling tool comprising:
    an electrical motor driving a first shaft,
    a pump driven by the motor for pumping well fluid in through an inlet and out through an outlet,
    a gear, driven by the first shaft extending through the pump, for reducing rotation of a second shaft, and
    a drilling head having bits and at least one drilling head fluid channel and being driven by the second shaft, the outlet of the pump being fluidly connected with the fluid channel to pump well fluid out through the fluid channel,
    wherein the gear is arranged in a gear housing, the gear housing arranged in a tool housing, the gear housing and the tool housing defining a gear fluid channel providing fluid communication between the pump and the drilling head fluid channel to prevent well fluid from entering the gear,
    wherein the drilling tool further comprises a compensator in fluid communication with the gear housing for pressurising the gear housing with a compensator fluid, and wherein, in use, a gear housing pressure in the gear housing is controlled so as to be greater than a tool housing pressure thus ensuring the well fluid does not contact the gear,
    wherein the pump is configured to transport both the well fluid and the compensator fluid, and
    wherein the well fluid has a serpentine path through the pump, and the compensator fluid passes through the first shaft within the pump in linear fashion.

* * * * *